Figure 1:
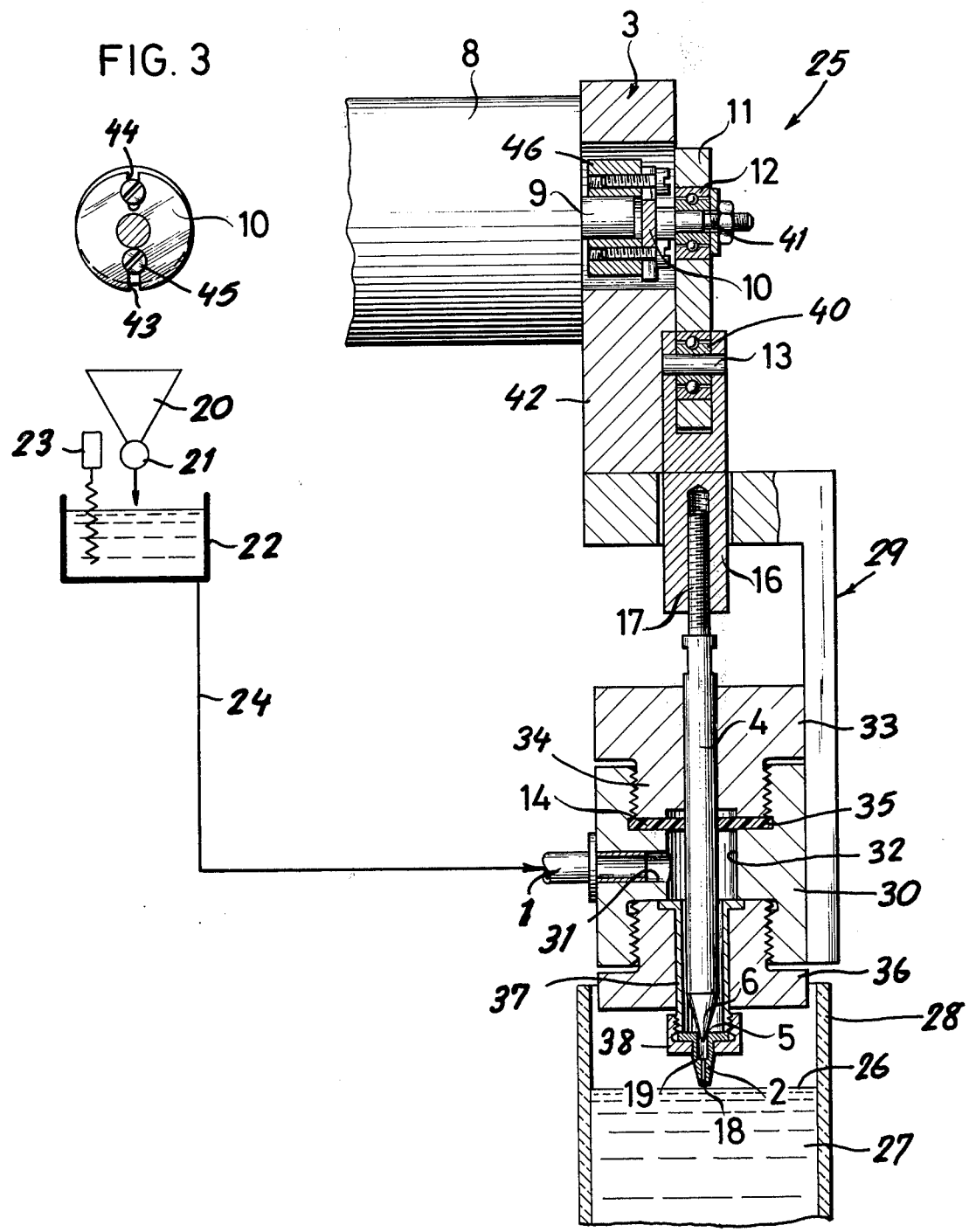
Figure 2:
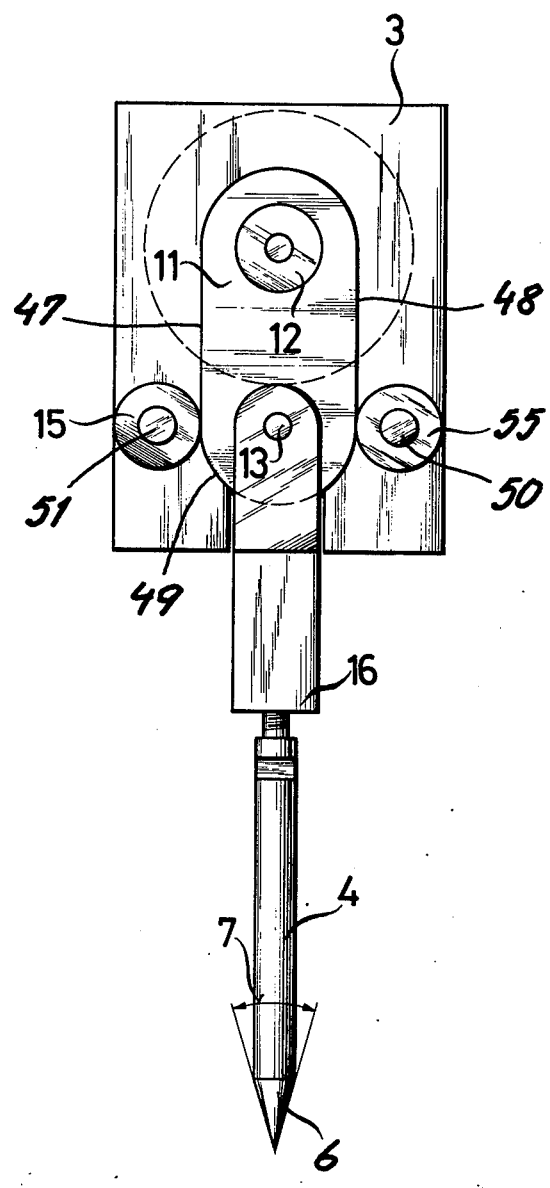

United States Patent [19]

Cramer et al.

[11] 4,006,848
[45] Feb. 8, 1977

[54] APPARATUS FOR PRODUCING NUCLEAR REACTOR PARTICLES

[75] Inventors: Josef Cramer; Willi Hannen, both of Julich, Germany

[73] Assignee: Kernforschungsanlage Julich Gesellschaft mit beschrankter Haftung, Julich, Germany

[22] Filed: Mar. 7, 1975

[21] Appl. No.: 556,312

[30] Foreign Application Priority Data

Mar. 12, 1974 Germany .......................... 2411745

[52] U.S. Cl. .............................................. 222/309
[51] Int. Cl.² ...................................... G01F 11/06
[58] Field of Search ................... 222/510, 309, 333

[56] References Cited

UNITED STATES PATENTS

| 1,815,589 | 7/1931 | Saachy | 222/510 X |
| 3,184,124 | 5/1965 | Beck | 222/333 |

Primary Examiner—Stanley H. Tollberg
Attorney, Agent, or Firm—Karl F. Ross; Herbert Dubno

[57] ABSTRACT

An apparatus for producing spherical uranium dioxide nuclear fuel particles having diameters of the order of several hundred microns comprises a source of an aqueous solution of uranyl nitrate, urea and hexamethylenetetramine, a container of a hot organic liquid, i.e. paraffin in which water is insoluble, and a droplet-forming dispenser connected between the source and the container. The dispenser has a constricted nozzle disposed above the free surface of the hot liquid and a piston displaceable in the passage leading thereto by a crank mechanism imparting periodic movement to the piston. The piston has a conical tip which cooperates with a seat along the passage having a larger flow cross-section than the nozzle orifice.

10 Claims, 3 Drawing Figures

APPARATUS FOR PRODUCING NUCLEAR REACTOR PARTICLES

CROSS-REFERENCE TO RELATED APPLICATION

The present application is related to the commonly assigned copending application Ser. No. 478,283 filed 11 June 1974 as a continuation of Ser. No. 312,023 filed 4 Dec. 1972, now abandoned, and a continuation of Ser. No. 93,874 filed 30 Nov. 1970, also abandoned.

FIELD OF THE INVENTION

The present invention relates to a droplet-forming dispenser for liquids and, more particularly, to an improvement in an apparatus for producing spherical nuclear reactor particles by chemical reaction of droplets of an aqueous solution in a heated liquid in which water is not soluble.

BACKGROUND OF THE INVENTION

In the above-identified applications, there is disclosed a system for the production of spherical nuclear fuel (fissionable-material) or breeder (fertile-material) particles — generally designated hereinafter as "nuclear-reactor particles" — with diameters of several hundred microns for direct use in the cores of power-producing or breeder-type nuclear reactors or for incorporation in fuel or fertile elements used in nuclear reactors. In accordance with the teachings of this application, ball-shaped droplets of an uranium-containing aqueous solution undergo chemical reaction and hardening.

The aqueous solution for the production of uranium dioxide nuclear particles may contain uranyl nitrate, urea and hexamethylenetetramine, produced by the addition of solid methylenetetramine to an aqueous solution of uranyl nitrate and urea-containing more than 500 g of uranium per liter. The droplets are caused to pass downwardly through a liquid in which water is insoluble and which does not solubilize in water, at an elevated temperature, generally above 100° C. After a brief residence time in this liquid, the coherent spherical particles are removed, treated with a highly volatile solvent to remove traces of the organic liquid, and are washed with an ammoniacal solution for removal of excess nitrate and urea. The particles are dried and are then sintered in a reducing atmosphere for several hours at a temperature of 1200° to 1400° C.

A simplified system for this purpose has a nozzle located directly above the free surface of the hot organic liquid so that the droplets of the aqueous solution form at the end of the nozzle and drop into the hot organic liquid.

The spherical uranium dioxide particles with a diameter of several hundred microns can be used in several different types of reactor as fuel or fertile materials. When they are used in so-called "high-temperature reactors" the particles are generally provided with pyrolytic carbon sheaths or coatings (so-called "coated particles") and may be embedded in a graphite matrix. It is important that the spherical particles be of uniform size so that the uranium density throughout the matrix is constant. Thus considerable effort has been invested heretofore in improvements in the particle-production techniques so as to obtain particles of uniform controlled size.

In a publication by Hass and Lackey, Oak Ridge National Laboratory, ORNL-TN-4094, it is taught that spherical particles of oxides of uranium and thorium can be recovered from colloidal solutions by gellation. In these cases, the colloidal solution is dropped from a nozzle surrounded by a sleeve channel into an alcohol stream. The individual droplets are produced by pulsing the aqueous solution in the supply line by a vibrator oscillating in the flow direction. The droplets, turn from the nozzle in the alcohol stream, form spheroids by the action of surface tension and are hardened in this form.

The pulsing stream takes place well ahead of the nozzle so that the droplet size is influenced more by the effect of the alcohol stream in tearing away the colloidal suspension as it emerges from the nozzle than by the pulsations. As a consequence, the uniformity of the droplets may not satisfy many requirements and the sphericity leaves much to be desired.

In both systems, the nozzles are readily blocked, thereby interrupting operation of the apparatus and irregular practical size distributions are produced.

It is the principal object of the present invention to provide an apparatus which is capable of overcoming these disadvantages and particular to provide a droplet-forming dispenser which is not as susceptible to blockage and is capable of producting particles of regular particle size (i.e. droplets).

Another object of this invention is to provide an apparatus for carrying out the process described in the aforementioned patent application, for the production of spherical nuclear reactor particles of uranium dioxide, such that the very droplets used in these systems are of uniform diameter so that side processes for classification and the like are no longer necessary.

Still another object of the invention is to provide an apparatus for producing spherical uranium dioxide particles which avoids the disadvantages of prior-art systems.

SUMMARY OF THE INVENTION

These objects and others which will be apparent hereinafter are attained in accordance with the invention by the provision of a droplet-forming dispenser which comprises housing means forming an inlet for a droplet-forming liquid, a downwardly open nozzle, an axially-extending passage running from the nozzle to the inlet for delivering the liquid to the nozzle, the nozzle having a discharge aperture of a flow cross-section less than that of the passage.

A valve seat is provided along the passage and has a flow cross-section in excess of that of the aperture and a closure piston is axially reciprocable in the passage toward and away from the seat by an eccentric of crank-drive means capable of imparting periodic motions to the piston.

The piston is formed with a conical tip engageable with the seat but reaching therebeyond toward the nozzle aperture.

The apparatus, according another aspect of the invention, comprises a source of an aqueous solution of uranyl nitrate, urea and hexamethylenetetramine, connected to the aforesaid inlet, and a container of paraffin or another liquid incapable of solubilizing water and maintained at a temperature in excess of 100° C, the free surface of the liquid in this container being disposed directly below the nozzle aperture.

Since the flow path from this source to the nozzle aperture is periodically blocked by the reciprocating piston, and the piston displacement determines the quantity which will be forced through the nozzle aperture, the amount of material forming each droplet is determined only by the stroke of the piston and is terminated by the engagement of the piston with the seat. Only a predetermined amount of material forms each droplet and thus the droplets all have the same size. Since the passages are blocked by the engagement of the piston with the valve seat, moreover, the droplet cannot draw any more than the displaced material with it as it falls into the container of paraffin. The conical trip of the piston, moreover, prevents blocking of the nozzle aperture. The conical tip also guarantees centering of the piston in the seat.

We have found, moreover, that the droplets leave the nozzle most cleanly when the angle of conicity (apex angle) of the tip ranges between 15° and 20°.

To permit adjustment of the droplet diameter, the invention provides that the stroke of the piston in the axial direction may be adjusted. To this end the drive means may include a crank drive having a link pivoted to the piston and swingably mounted on a disk at an eccentric axis which can be shifted relative to the axis of rotation of the disk and locked in plate relative thereto. It has been found to be advantageous, moreover, to provide an adjustable connection between the link and the piston so that the piston may always properly engage the seat in its lowest dead-center position.

A satisfactory guidance of the blocking piston can be attained by guiding the link in the region of its pivotal connection to the piston, on opposite sides or flanks between a pair of rollers journaled at fixed locations to the housing structure on ball bearings.

While we prefer to use the dispenser for the production of spherical nuclear reactor particles of uranium oxide in the manner described, the dispenser need not be limited to such use since it is also effective wherever the production of uniform-size droplets are to be made. For example, the aqueous solution may contain colloidal graphite as an additive.

BRIEF DESCRIPTION OF THE DRAWING

The above and other objects, features and advantages of the present invention will become more readily apparent from the following description, reference being made to the accompanying drawing in which:

FIG. 1 is a vertical section showing an apparatus according to the invention;

FIG. 2 is a side-elevational view thereof; and

FIG. 3 is a detail view showing the eccentric disk of the system of FIG. 1.

In FIG. 1 of the drawing, a hopper 20 has a metering device 21 for dispensing hexamethylenetetramine into a vessel 22 containing an aqueous solution of uranyl nitrate and urea and stirred by a mixer 23. The solution is prepared as described in the aforementioned application. A duct 24 connectes this vessel 22 with the inlet 1 of the drop-forming dispenser generally represented at 25. The nozzle 2 thereof is disposed directly above the free surface 26 of a column of paraffin 27 at a temperature above 100° C in a container 28.

The dispenser comprises a housing represented generally at 29 and consisting of a cylindrical body 30 formed with a lateral bore 31 in which the inlet 1 is fitted. A vertically extending axial passage 32 in this body is closed at one end by a plug 33 whose threaded part 34 clamps a sealing membrane 14 against a shoulder 35.

Another plug 36 is threaded into this body to close the opposite side of the passage 31 and carries a stainless steel sleeve 37 onto which is threaded a nut 38 to hold a nozzle 2 in place.

A blocking piston 4 extends through the passage and is formed at its upper end with a threaded rod 17 engaged in an extension 16 which is hinged on a pin 13 via a ball-bearing 12 on a shaft 41 fixed to an eccentric disk 10. The latter forms part of a crank drive 3 which is received in the housing member 42 connected to the body of an electric motor 8 whose output shaft is shown at 9. The disk 10 is formed with a pair of slots 43 and 44 through which screws 45 pass to engage a cylindrical block 46 mounted upon and keyed to the shaft 9.

The link 11 has straight flanks 47 and 48 which merge into a rounded end 49 substantially at the level of the axis of pin 13 and, in this region, the flanks 47 and 48 are engaged by rollers 15 and 55 journaled by ball-bearings on the shaft 50 and 51 fixed to the housing member 42.

The blocking piston 4 is positioned coaxially with the nozzle 2 which has a conical tip 8 engaging a seat 5 of larger cross-section than the outlet aperture 18 of the nozzle. The passage between the seat 5 and the constricted aperture 18 is somewhat larger as shown at 19.

As already noted, the drive system comprises an electric motor 8 whose shaft 9 rotates the eccentric disk 10 which can have its eccentric axis adjustable by loosening the screws 45 and displacing the disk. The threaded connection 16, 17 and the throw of the eccentric are adjusted so that the conical tip 6, which has an apex angle 7 of 15° to 20°, engages the seat 5 in the lower dead-center position of the piston. The rollers 15 and 55, positioned at the transition between the rounded and straight portions of the link 11 prevent jamming of the device. Instead of a selflocking screw 17, a multiturn fine thread may be provided with a counternut. The frequency with which the piston 4 operates is determined by the speed of the motor 8.

Piston 3 and seat 4 are preferably composed of metal, at least the tip 6 being high alloy, high hardness steel. The seat 5 can be readily removed for replacement and refinishing.

The specific examples of the prior applications apply here as well except that the use of the dispenser insured substantial constancy of particle size.

We claim:

1. A droplet-forming device for the production of spherical fertile or nuclear fuel particles, comprising:

housing means forming an inlet for a droplet-forming liquid adapted to congeal to form said particles, a downwardly open droplet-forming nozzle, an axial passage extending from said inlet to said nozzle and coaxial therewith for delivering said liquid thereto, said nozzle having a discharge aperture of a flow cross-section less than that of said passage, and a valve seat along said passage of a flow cross-section in excess of that of said aperture;

a closure piston axially reciprocable in said passage toward and away from said seat, said piston having a conical tip receivable in and engageable with said seat;

means for periodically actuating said piston; and means below said nozzle for receiving said droplets and congealing same into said particles.

2. The device defined in claim 1 wherein said conical tip has an apex angle between 15° and 20°.

3. The device defined in claim 2, further comprising means for varying the stroke of said piston.

4. The device defined in claim 1 wherein said means for periodically actuating said piston includes a variable speed drive and eccentric means between said drive and said piston, said eccentric means including an articulated link.

5. A droplet-forming dispenser, comprising:
housing means forming an inlet for a droplet-forming liquid, a downwardly open nozzle, an axial passage extending from said inlet to said nozzle and coaxial therewith for delivering said liquid thereto, said nozzle having a discharge aperture of a flow cross-section less than that of said passage, and a valve seat along said passage of a flow cross-section in excess of that of said aperture;
a closure piston axially reciprocable in said passage toward and away from said seat, said piston having a conical tip receivable in and engageable with said seat;
means for periodically actuating said piston, said means for periodically actuating said piston including a variable speed drive and eccentric means between said drive and said piston, said eccentric means including an articulated link; and
a pair of rollers journaled in ball-bearings on said housing means and laterally engaging said link.

6. In an apparatus for the production of spherical nuclear reactor particles of uranium dioxide with diameters of the order of several hundreds of microns, the combination which comprises:
a source of an aqueous solution of uranyl nitrate, urea and hexamethylene tetramine;
a container of a liquid incapable of solubilizing water at a temperature in excess of 100° C, said liquid having a free surface exposed in said container; and
a droplet forming dispenser, comprising:
housing means forming an inlet connected to said source, a downwardly open droplet-forming nozzle, an axial passage extending from said inlet to said nozzle and coaxial therewith for delivering said solution thereto, said nozzle having a discharge aperture of a flow cross-section less than that of said passage, and a valve seat along said passage of a flow cross-section in excess of that of said aperture;
a closure piston axially reciprocable in said passage toward and away from said seat, said piston having a conical tip receivable in and engageable with said seat; and
means for periodically actuating said piston.

7. The combination defined in claim 6 wherein said conical tip has an apex angle between 15° and 20°.

8. The combination defined in claim 7, further comprising means for varying the stroke of said piston.

9. The combination defined in claim 6 wherein said means for periodically actuating said piston includes a variable speed drive and eccentric means between said drive and said piston, said eccentric means including an articulated link.

10. In an apparatus for the production of spherical nuclear reactor particles of uranium dioxide with diameters of the order of several hundreds of microns, the combination which comprises:
a source of an aqueous solution of uranyl nitrate, urea and hexamethylene tetramine;
a container of a liquid incapable of solubilizing water at a temperature in excess of 100° C, said liquid having a free surface exposed in said container; and
a droplet-forming dispenser, comprising:
housing means forming an inlet connected to said source, a downwardly open nozzle, an axial passage extending from said inlet to said nozzle and coaxial therewith for delivering said solution thereto, said nozzle having a discharge aperture of a flow cross-section less than that of said passage, and a valve seat along said passage of a flow cross-section in excess of that aperture;
a closure piston axially reciprocable in said passage toward and away from said seat, said piston having a conical tip receivable in and engageable with said seat;
means for periodically actuating said piston, said means for periodically actuating said piston including a variable speed drive and eccentric means between said drive and said piston, said eccentric means including an articulated link; and
a pair of rollers journaled in ball-bearings on said housing means and laterally engaging said link.

* * * * *